United States Patent [19]

Krantz

[11] Patent Number: 5,101,400
[45] Date of Patent: Mar. 31, 1992

[54] DYNAMIC CIRCUIT IDENTIFIER

[75] Inventor: Louis Krantz, Chester, N.J.

[73] Assignee: AT&T Bell Laboratories, Murray Hill, N.Y.

[21] Appl. No.: 414,875

[22] Filed: Sep. 29, 1989

[51] Int. Cl.⁵ .............................................. H04J 3/14
[52] U.S. Cl. .................................. 370/13; 370/110.1; 379/246
[58] Field of Search .......................... 370/13.17, 110.1; 379/96, 25, 32, 136, 246

[56] References Cited

U.S. PATENT DOCUMENTS

| 4,788,682 | 11/1988 | Vij et al. | 379/96 |
| 4,942,599 | 7/1990 | Gordon et al. | 379/246 |

Primary Examiner—Dougla W. Olms
Assistant Examiner—Melvin Marcelo
Attorney, Agent, or Firm—Eli Weiss

[57] ABSTRACT

The implementation of BRI/ISDN services is changing the way services can be maintained with existing operations support systems. For example, with ISDN a subscriber to the service can initiate and effect a move of his director or telephone number from one location to another without directly involving the operating company. The subscriber, by moving his directory number to a new location, now receives his service over a new transport facility. As a result, the records of the operating company which identify a specific transport facility to a specific telephone number cannot be readily updated to reflect subscriber moves. Thus, if the records of the operating company do not identify the transport facility which is associated with the directory number at the new location the operating company cannot readily process trouble reports against the service. The new operations system and electronic processing switch methodology disclosed solves the major operational problems associated with processing trouble report on BRI/ISDN service in an environment where the subscribers can move their own services. In operation, this invention initiates a trouble report on an ISDN service line record and then links the report to the appropriate facility line record information for repair processing based on an identifier obtained from the electronic processing switch.

6 Claims, 2 Drawing Sheets

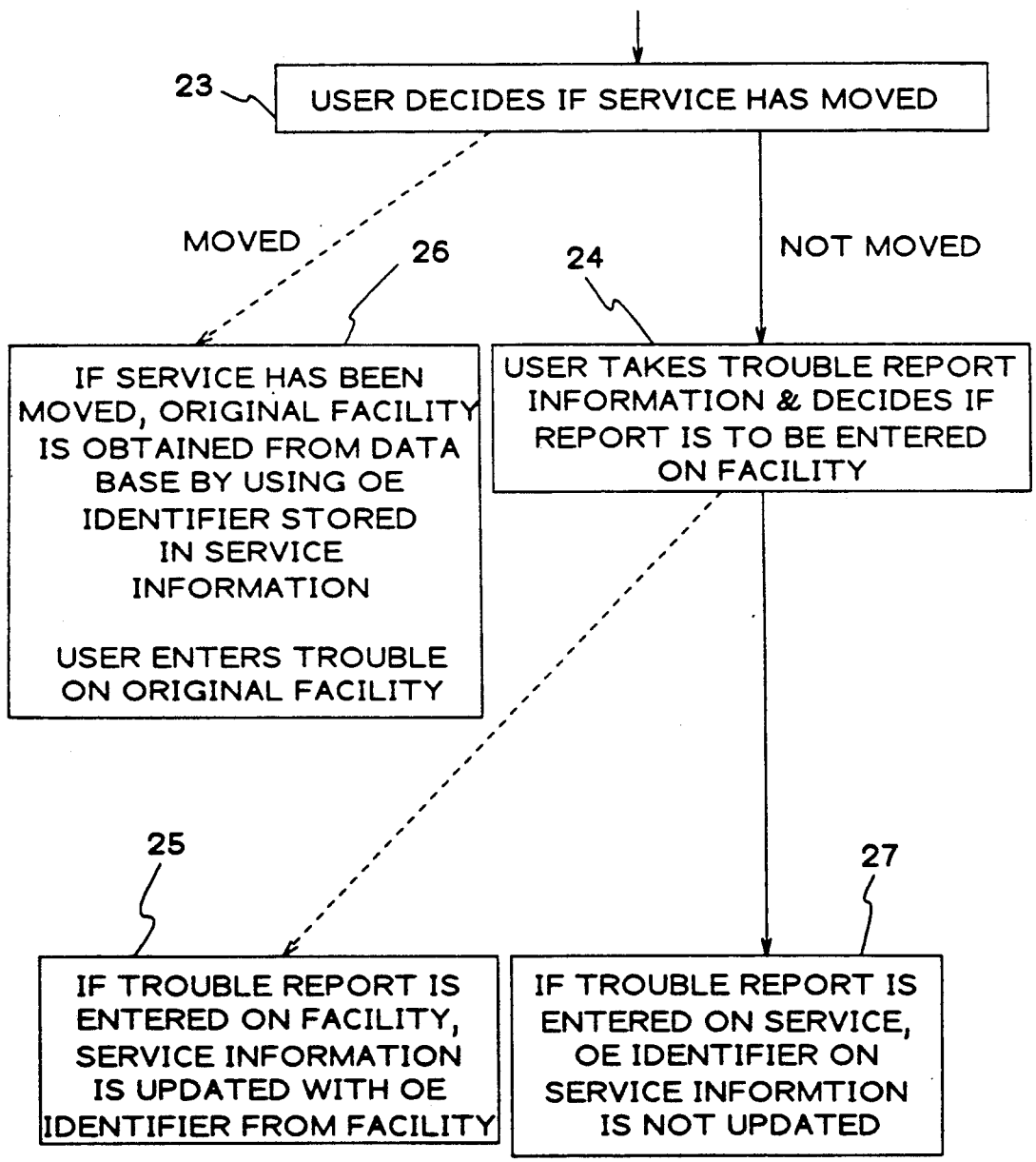

DYNAMIC CIRCUIT IDENTIFIER

TECHNICAL FIELD

This invention relates generally to telephone networks and, more particularly, to dynamically identifying the digital subscriber line interconnect between an electronic processing switch and a station set for processing a trouble report on Basic Rate Interface Integrated Services Digital Network service.

BACKGROUND OF THE INVENTION

The implementation of Basic Rate Interface/Integrated Services Digital Network service (BRI/ISDN) is changing the way telephone loops are modeled in operation support systems, and in how services can be maintained with existing operations support systems. For example, with ISDN a subscriber to the service can initiate and effect a move of his directory or telephone number from one location to another without directly involving the operating company. The subscriber, by moving his directory number to a new location, receives his service over a new digital subscriber line. The digital subscriber line is the transport facility which carries the digital signal between the subscriber's location and the operating telephone company's network switching element.

As a result, the records of the operating company which identifies a specific transport facility to a specific telephone number cannot be readily updated to reflect subscriber moves. Thus, if the records of the operating company do not identify the transport facility which is associated with the directory number at the new location, the operating company cannot readily process trouble reports against the service.

SUMMARY OF THE INVENTION

This invention solves the major operational problems associated with processing a trouble report on BRI/ISDN service in an environment where the subscribers can move their own services. In operation, this invention initiates a trouble report on an ISDN service line record and then links the report to the appropriate digital subscriber line record information for repair processing based as an identifier obtained from the electronic processing switch. With this invention, the operations system becomes impervious to changes which are initiated directly by a subscriber in the network switching element.

The invention interfaces with the network switching element (i.e., the electronic processing switch) as follows: When a trouble report on a subscriber's service is entered into the operations system by telephone number, a request is automatically made to the network switching element for the identify of the transport facility (the digital subscriber line) being used to provide the service. When the switch returns the identify of the digital subscriber line, the corresponding record for the digital subscriber line is obtained and the trouble report on the subscriber's service is entered against the digital subscriber line. The switch does not normally use the same kind of identifier for the digital subscriber line that the operations system uses. However, the switch identifier commonly known as the originating equipment identifier, is contained in the operations system digital subscriber line record as a part of the information which describes the transport facility. Therefore, as part of the method of identifying a defective circuit, a secondary identifier which uses the switching element's name for the digital subscriber line is automatically set up when the facility line record is created in the operation system. Using the switching element name as a secondary identifier enables the operations system to find the digital subscriber line record by either its conventional name or by the name the switching element uses.

BRIEF DESCRIPTION OF THE DRAWING

A more complete understanding of the invention can be obtained by reading the following description of a specific illustrative embodiment of the invention in conjunction with the appended drawing in which FIGS. 1 and 2 show a flowchart of the method of dynamically identifying a circuit in accordance with the principles of the invention.

DETAILED DESCRIPTION

Figure 1:
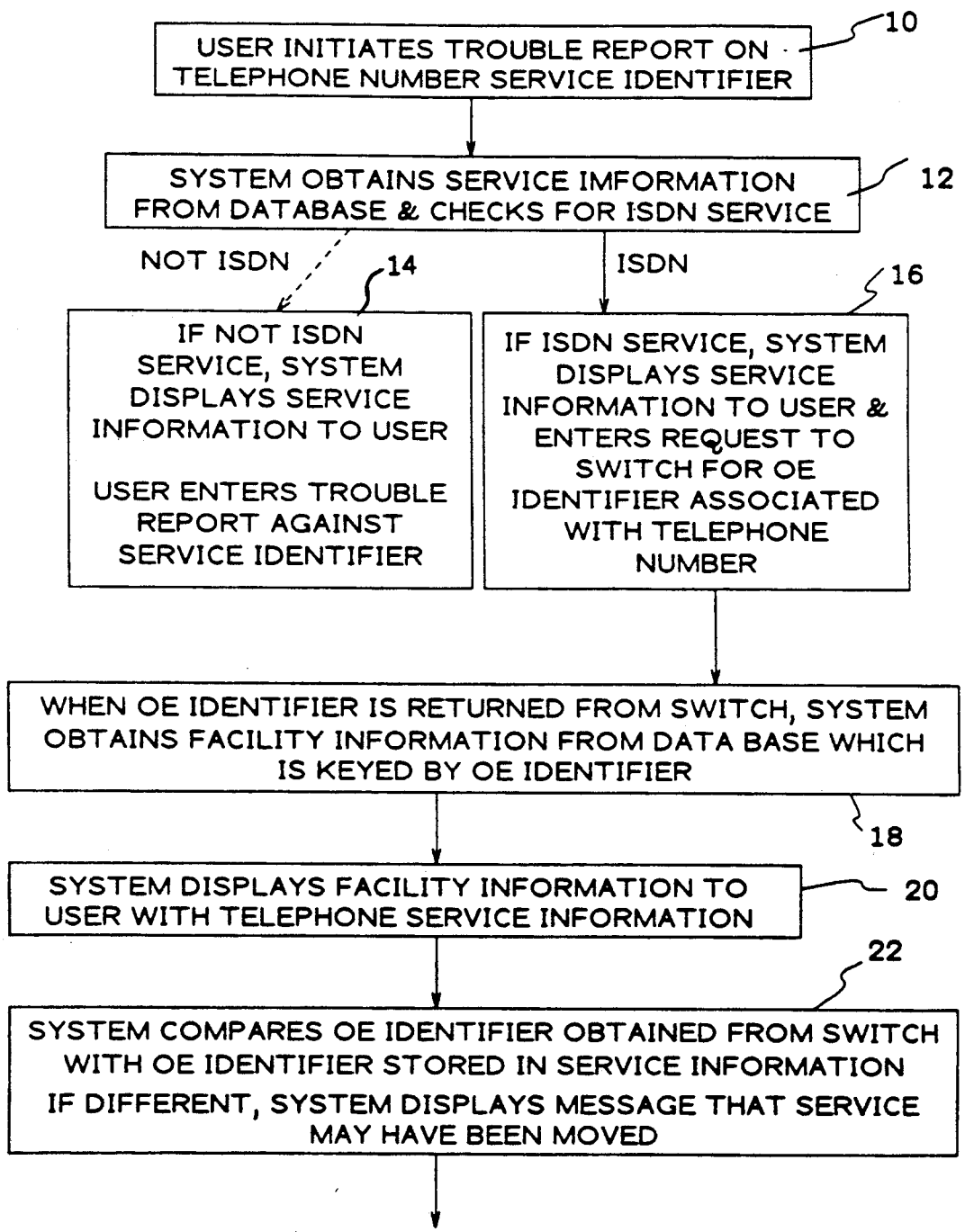

The communication system which can utilize the invention here disclosed can provide the following features: The association of more than one directory number with a given digital subscriber line and the service features associated with each directory number can be different, even for numbers on the same digital subscriber line. The ability for subscribers to reassign their service, as represented by the directory number, to another digital subscriber line. This is normally referred to as the automatic customer station rearrangement/integrated services digital network feature. The ability to install a digital subscriber's line in a default service state which means that it is not associated with any directory number, and can only be accessed in the electronic processing switch by its associated originating equipment identifier.

The association of a digital subscriber line with more than one service identifier, i.e., the directory (telephone) number where each separate identifier represents a service being provided is commonly referred to as a multipoint digital subscriber line. From a functional point-of-view the subscriber sees the digital subscriber line as a vehicle for getting information from the public network to one or more station sets (terminals) connected to the digital subscriber line, where each set can be associated with one or more directory numbers. The fact that the digital subscriber line is implemented on one (or two) pairs of wires, or over a digital carrier system, is of no general concern to the subscribers who identify their services with the directory numbers associated with the sets. Thus, in most instances, subscribers prefer to report their troubles on the service identifier rather than the circuit identifier associated with the digital subscriber line facility, if at all possible.

For maintenance purposes, within the electronic processing switch, there is a so-called primary directory number which is associated with a subscriber's service and, thus, the station set. When the electronic processing switch is given a primary directory number, it uniquely maps it to a particular digital subscriber line, and is able to direct messages to the station set associated with this primary directory number. Up to eight primary directory numbers can be associated with a digital subscriber line. In general, it is assumed that the subscriber knows the primary directory number associated with his service, and will report any troubles associated with the service against the primary directory number.

The ability to associate more than one directory number with a digital subscriber line (multipoint digital subscriber line), with each number associated with its own service profile, suggests that in a maintenance operations support system a line record be created for each directory number associated with BRI/ISDN service; and that a separate line record be created for each digital subscriber line which is keyed by a unique identifier for administrative purposes, e.g., a common language serial number format identifier. In order to relate the service line record set up for each directory number with its associated digital subscriber line record, the service line record must contain the digital subscriber line identifier. Thus if a trouble report is received against the directory number, the digital subscriber line identifier in the service line record must be accessed to permit trouble entry against the digital subscriber line. While this methodology works well if the relationship between the directory number for BRI/ISDN service and the digital subscriber line providing the transport facility is stable, a major operational problem with respect to trouble report entry occurs in an automatic customer station environment since the digital subscriber line identifier associated with service can be changed at will by the subscriber.

In operation, this invention enables a trouble report to be initialized by entering an ISDN related directory number. However, when the trouble report work item is created in the operations system, it is against the appropriate digital subscriber line and not the directory number regardless if the subscriber is able to move their service. In addition, if several reports on different directory numbers, which are related to the same digital subscriber line are received, only one work item will be created against the digital subscriber line. That work item, however, will be associated with as many reports as were received that were linked to the digital subscriber line. In essence, in this invention, the trouble report against the directory number is dynamically linked with the appropriate digital subscriber line record by means of a dynamic circuit identifier.

In operation, when an ISDN trouble report entering scenario is initialized in the maintenance operations system, a request is made through an interfacing testing system (Mechanized Loop Testing system) used in most Bell System operating telephone companies to obtain from the electronic processing switch the status of the digital subscriber line and originating equipment identifier associated with the entered directory number. When the operations system trouble report mask is initially displayed after the trouble entry mask is transmitted, it contains only the line record information associated with the entered directory number, and a message indicating that a verification is in progress. When the interfacing testing system returns the status and the originating equipment identifier information obtained from the electronic processing switch, the operations system retrieves the digital subscriber line record associated with the entered directory number, using the originating equipment identifier. In addition, the operations system checks for any open trouble report information that exists against the digital subscriber line. The appropriate information including the status of the digital subscriber line is then posted on the trouble report mask.

The operations system retrieves the digital subscriber line information in the following manner: When the digital subscriber line record is created, the operations system update program uses the administrative identifier assigned to the line; e.g. a common language serial number format identifier, as specified in the service order information, as the record's primary line identifier. In addition, the operations system update program automatically stores the originating equipment identifier associated with the digital subscriber line, as obtained from the service order information, as a secondary line identifier. Thus, during the trouble report entry scenario, the operations system is able to access the appropriate digital subscriber line record by using the originating equipment identifier returned from the electronic processing switch because the originating equipment is a secondary line identifier.

The person entering the trouble report uses the displayed digital subscriber line and status information to assist in the process of taking the report from the subscriber. At the conclusion of the trouble entry process, the trouble report mask is entered. When the trouble report mask is entered, a maintenance work item is created against the digital subscriber line in the operations system. The work item also contains the reported directory number which initiated the trouble report. If a maintenance work item already existed against the linked digital subscriber line, the new trouble report information is used to update the existing work item.

In operation, prior to obtaining a trouble report, the operations system should be set to create a line record for each directory number associated with BRI/ISDN. Additionally, a separate line record should be created for each digital subscriber line and keyed by both an administrative identifier and by the lines' associated originating equipment identifier. Referring to the FIG., an ISDN service subscriber, upon becoming aware of a problem with the service, telephones the complaint to a repair person who as a user of the operations system initiates a trouble report 10 keyed to the telephone number of the subscriber's service. Immediately thereafter, service information is obtained from the database to determine if the subscriber has ISDN service 12. If the subscriber does not have ISDN service, the existing procedure for entering a trouble report against the telephone number is followed by the repair person 14.

If, however, the information from the database shows that the subscriber is connected to receive ISDN service, the service information is displayed 16 to the repair person, and a request is automatically made through the testing system interface to the switch to obtain the status and originating equipment identifier which uniquely identifies the digital subscriber line record in the operations system currently associated with the directory or telephone number entered. Therefore, when this information is returned 18, the operations system accesses the digital subscriber line record and any associated pending trouble report information, and updates the existing trouble report mask 20 with the following information: a code representing the status of the service, and the administrative identifier, e.g. the common language serial number format, location, and pending trouble information, if any, associated with the linked digital subscriber line currently associated with the entered directory number. If the digital subscriber line has facilities which are associated with a failure, the standard failure information is also displayed. If the originating equipment identifier stored in the directory number line record is different than the originating equipment identifier returned by the electronic processing switch, a message is displayed indicating that a "possible move since last report" may have taken place 22.

The electronic processing switch will return the appropriate information identifying the digital subscriber line if the entered directory number for the report is a primary directory number. If a non-shared or a shared secondary directory number is entered for the report, the electronic processing switch will return a message indicating that the entered directory number is not a primary directory number. In these cases the trouble report either has to be taken directly against the directory number, or an appropriate primary directory number which is associated with the digital subscriber line experiencing the trouble has to be identified by the subscriber reporting the trouble.

Referring to the FIG. based on the additional information displayed to the repair person, and possibly with additional subscriber information, the following steps can occur: 23→24→25; 23→26; or 23→24→27. For example, the trouble report is entered against the linked digital subscriber line and for the entered directory number, 23→24→25; the trouble report is entered against the digital subscriber line associated with the originating equipment identifier stored in the operations system directory number line record, 23→26; or the trouble report is entered against the directory number, 23→24→27.

In the instance where the trouble report is entered against the digital subscriber line for the directory number (23→24→25), the repair person has confirmed that the linked digital subscriber line is correct and that the trouble report should be entered against the digital subscriber line with information identifying the directory number reporting the trouble. By transmitting the trouble report mask, as is, the following takes place: If there is no existing trouble against the digital subscriber line, and the digital subscriber line is not involved in a facility failure, the trouble report mask information is used to create a maintenance work item against the digital subscriber line. In addition, if the returned status of the line is such that additional testing is of value then the digital subscriber line maintenance work item is set up on the operations system test queue for additional automatic testing by the interfacing testing system. When the test request is submitted the following occurs: An automatic test for an ISDN service is requested; the test request is made for the directory number obtained from the maintenance work item information; and the testing parameters submitted with the request are obtained from the digital subscriber line record. The retest situation does not apply if there is an existing "trouble" against the digital subscriber line, or the digital subscriber line is involved in a facility failure.

Once the digital subscriber line work item is created, and retested, if appropriate, the normal operations system processing scenario applies similar to the process for trouble reports on analog lines.

In the instance where the trouble report is entered against the digital subscriber line associated with the stored originating equipment identifier (23→26), the repair person has determined that the subscriber has moved the station set after encountering trouble, but the digital subscriber line with the problem is the one associated with the originating equipment identifier stored in the line record for the entered directory number. The information on this digital subscriber line is obtained by entering a command on the trouble report mask of the operations system. By transmitting the trouble report mask with the linked digital subscriber line associated with the stored originating equipment identifier displayed, the processing described above for the case where the digital subscriber line is linked to the entered directory number occurs except: If the request for an automatic test is made, the test is requested by the originating equipment identifier associated with the digital subscriber line. The process knows that this is required because the directory number obtained from the maintenance work item information of the trouble report is preceded by a special flag.

In the instance where the trouble report is entered against the directory number (23→24→27) the repair person has determined that the report should be entered directly against the directory number rather than the linked digital subscriber line. For example, if the problem is recognized as being due to a switch translation error, there is no need to link the trouble report to the digital subscriber line. To initiate this scenario, the repair person enters an appropriate command which permits the trouble to be entered against the directory number. At this instant, the following occurs: If there is no existing trouble against the directory number, the trouble report mask information is used to create a maintenance work item against the entered directory number. The test on ISDN service work items created against the directory number is never performed.

As noted previously, the implementation of BRI-/ISDN services is changing the way services can be maintained with existing operations support system. For example, with ISDN a subscriber to the service can initiate and effect a move of his directory or telephone number from one location to another without directly involving the operating company. The subscriber, by moving his directory number to a new location, now receives his service over a new transport facility. As a result, the records of the operating company which identify a specific transport facility to a specific telephone number cannot be readily updated to reflect subscriber moves. Thus, if the records of the operating company do not identify, the transport facility which is associated with the directory number at the new location, the operating company cannot readily process trouble reports against the service. The new operations system and electronic processing switch methodology disclosed above solves the major operational problems associated with processing a trouble report on BRI-/ISDN service in an environment where the subscribers can move their own services. In operation, this invention initiates a trouble report on an ISDN service line record and then links the report to the appropriate digital subscriber line record information for repair processing based on an identifier obtained from the electronic processing switch.

I claim:

1. A method of identifying the transport facility interconnect between an electronic processing switch and a station set for processing a trouble report for BRI-/ISDN service Characterized by obtaining a directory number associated with the station set, and then obtaining from the electronic processing switch the identifier of the transport facility which connects the electronic processing switch to the directory number.

2. The method of claim 1

Characterized by obtaining from the electronic processing switch the identity of an originating equipment identifier which is coupled to said station set having said directory number, and identifying the transport facility which couples said originating equipment identifier to said station set.

3. The method of claim 2 characterized by
obtaining a facility line record for said originating equipment identifier, and linking said originating equipment identifier which is associated with the directory number with a facility line record for said originating equipment identifier coupled to said station set to identify the transport facility which couples said originating equipment identifier to said station set.

4. The method of claim 3 characterized by
including in the facility line record the originating equipment identifier obtained from the electronic processing switch.

5. The method of claim 2 characterized by
locating a trouble report previously generated for the same directory number on the current transport facility, and combining the information on the previously generated trouble report for said directory number with that on the trouble report being processed for said same directory number to provide a single trouble report for a common directory number.

6. The method of claim 2 characterized by
comparing an originating equipment identifier associated with the directory number with the originating equipment identifier obtained from the electronic switch to determine if the station set has been moved since the problem was first reported.

* * * * *